US012736097B2

(12) United States Patent
Szabo et al.

(10) Patent No.: US 12,736,097 B2
(45) Date of Patent: Sep. 15, 2026

(54) BRAKE ASSEMBLY AND METHOD FOR CONTROLLING A BRAKE ASSEMBLY

(71) Applicant: KNORR-BREMSE Systeme fuer Nutzfahrzeuge GmbH, Munich (DE)

(72) Inventors: Janos Szabo, Budapest (HU); Michael Blessing, Munich (DE); Robert Trimpe, Wessling (DE); Wolfgang Pahle, Bad Wiessee (DE); Matthias Klingner, Moorenweis (DE); Andreas Buch, Taufkirchen (DE); Andras Sipos, Munich (DE); Huba Nemeth, Budapest (HU); Csaba Kokrehel, Budapest (HU); Viktor Tihanyi, Budapest (HU); Csaba Mlinarcsek, Budapest (HU)

(73) Assignee: KNORR-BREMSE Systeme fuer Nutzfahrzeuge GmbH, Munich (DE)

(*) Notice: Subject to any disclaimer, the term of this patent is extended or adjusted under 35 U.S.C. 154(b) by 742 days.

(21) Appl. No.: 17/277,196

(22) PCT Filed: Aug. 29, 2019

(86) PCT No.: PCT/EP2019/073093
§ 371 (c)(1),
(2) Date: Mar. 17, 2021

(87) PCT Pub. No.: WO2020/057931
PCT Pub. Date: Mar. 26, 2020

(65) Prior Publication Data

US 2022/0034375 A1 Feb. 3, 2022

(30) Foreign Application Priority Data

Sep. 18, 2018 (EP) .................................... 18195250

(51) Int. Cl.
*B60T 1/06* (2006.01)
*B60T 13/74* (2006.01)
(Continued)

(52) U.S. Cl.
CPC .............. *F16D 61/00* (2013.01); *B60T 1/065* (2013.01); *B60T 13/746* (2013.01);
(Continued)

(58) Field of Classification Search
CPC ........ F16D 55/41; F16D 55/226; F16D 61/00; F16D 65/005; F16D 65/18; F16D 65/40;
(Continued)

(56) References Cited

U.S. PATENT DOCUMENTS 3,357,522 A * 12/1967 Smith ..................... F16D 65/18 188/72.8
4,281,881 A * 8/1981 Mekosh, Jr. .............. B60T 8/74 303/DIG. 8
(Continued)

FOREIGN PATENT DOCUMENTS

CN 1682039 A 10/2005
EP 0 036 568 A1 9/1981
(Continued)

OTHER PUBLICATIONS

English machined translation of EP-1522756 A1, Apr. 13, 2005.*
(Continued)

*Primary Examiner* — Robert A. Siconolfi
*Assistant Examiner* — San M Aung
(74) *Attorney, Agent, or Firm* — Crowell & Moring LLP

(57) ABSTRACT

A brake assembly has a brake disc in rotational engagement with a wheel of a vehicle, a brake pad which frictionally engages the brake disc when an actuator force is applied thereto, an actuator having an output shaft driven in a forward direction and a reverse direction in order to bring
(Continued)

the brake pad and brake disc into the frictional engagement, and an energy absorption and/or storage unit. The energy absorption and/or storage unit absorbs forces acting on the output shaft in the reverse direction in case of a predetermined operation situation.

12 Claims, 1 Drawing Sheet

(51) Int. Cl.
*F16D 55/226* (2006.01)
*F16D 61/00* (2006.01)
*F16D 65/00* (2006.01)
*F16D 65/18* (2006.01)
*F16D 65/40* (2006.01)
*F16D 121/24* (2012.01)
*F16D 125/64* (2012.01)

(52) U.S. Cl.
CPC ......... *F16D 55/226* (2013.01); *F16D 65/005* (2013.01); *F16D 65/18* (2013.01); *F16D 65/40* (2013.01); *F16D 2121/24* (2013.01); *F16D 2125/64* (2013.01)

(58) Field of Classification Search
CPC .......... F16D 65/52; F16D 65/56; F16D 65/72; F16D 65/74; F16D 18/005; F16D 2121/02; F16D 2121/04; F16D 2121/14; F16D 2125/64; F16D 2125/40; F16D 2127/02; F16D 2127/085; B60T 1/10; B60T 1/065; B60T 8/885; B60T 8/1703; B60T 13/741; B60T 13/746; B60T 2270/82; B60T 2270/404; B60T 2270/414; B60T 7/108; B60T 17/081; B61H 15/00; H02J 7/345
USPC .......................................................... 188/72.3
See application file for complete search history.

(56) References Cited

U.S. PATENT DOCUMENTS 4,553,644 A * 11/1985 Folch ...................... F16D 55/10 188/72.4
5,746,292 A * 5/1998 Tanaka ................ F16D 65/0006 188/73.37
2003/0136616 A1* 7/2003 Hageman ................ F16D 65/18 188/73.31
2005/0258682 A1 11/2005 Halasy-Wimmer et al.
2006/0108867 A1* 5/2006 Ralea .................... B60T 8/1703 303/152
2008/0128222 A1* 6/2008 Birkeneder ......... F16D 55/2255 188/71.7
2010/0044168 A1* 2/2010 Kloos ..................... B60T 17/08 188/73.1
2012/0217104 A1 8/2012 Liermann et al.
2016/0131212 A1 5/2016 Yamasaki et al.
2016/0176518 A1 6/2016 Eyanga et al.
2017/0234380 A1* 8/2017 Yasui .................... F16D 63/006 188/72.1
2017/0321771 A1 11/2017 Lee et al.
2017/0355356 A1* 12/2017 Okada ....................... B60T 7/06
2019/0023151 A1* 1/2019 Glinka .................. B60T 17/228
2020/0114890 A1* 4/2020 Williamson .......... F16D 65/092
2020/0290584 A1 9/2020 Naka et al.
2020/0384972 A1* 12/2020 Calvo Martinez .... B60T 13/743

FOREIGN PATENT DOCUMENTS

EP 1 522 756 A1 4/2005
EP 3 034 368 A1 6/2016
JP 7-23622 Y2 5/1995
JP 2009-515499 A 4/2009
JP 2015-1238 A 1/2015
JP 2017-165181 A 9/2017
WO WO 2007/053889 A1 5/2007
WO WO 2011/038998 A1 4/2011
WO WO-2018114275 A1 * 6/2018 .......... B60W 10/192

OTHER PUBLICATIONS

Japanese-language Office Action issued in Japanese Application No. 2021-538902 dated May 16, 2022 with English translation (four (4) pages).
Chinese-language Office Action issued in Chinese Application No. 201980060714.2 dated Jul. 5, 2022 with English translation (11 pages).
Korean-language Office Action issued in Korean Application No. 10-2021-7011272 dated Sep. 27, 2022 with English translation (10 pages).
International Search Report (PCT/ISA/210) issued in PCT Application No. PCT/EP2019/073093 dated Nov. 20, 2019 (four (4) pages).
Written Opinion (PCT/ISA/237) issued in PCT Application No. PCT/EP2019/073093 dated Nov. 20, 2019 (eight (8) pages).
Extended European Search Report issued in European Application No. 18195250.8 dated Mar. 29, 2019 (nine (9) pages).

* cited by examiner

BRAKE ASSEMBLY AND METHOD FOR CONTROLLING A BRAKE ASSEMBLY

BACKGROUND AND SUMMARY OF THE INVENTION

The present invention relates to a brake assembly. Further, the present invention provides a method for controlling a brake assembly.

Generally, an actuator of a vehicle wheel brake underlies two main challenges. Firstly, especially the wheel brake actuators using electro-mechanic principles are linked with very significant inertia, i.e. stop energy in its actuating end positions. Secondly, the wheel brake actuators have to perform highly dynamic actuating movements in particular due to the increased weight of the vehicles and the increasing requirements with regard to braking efficiency.

It was found out that in case of a malfunction or a power loss, especially when wheel brake actuators are operated with high speed, damage to the wheel brake components may occur. For example, an output shaft, which is connected with the actuator, for realizing frictional engagement between a brake pad and a brake disc in order to establish the braking force may cause a hard impact of components coupled to the output shaft onto an abutting element defining an actuating end position when a malfunction or power loss arises.

It is an object of the present invention to overcome the disadvantages of the prior art, in particular to provide a brake assembly where damage to brake assembly components in particular due to inertia and/or high dynamic actuation is prevented.

The object is solved by the subject matter of the independent claims.

According to an aspect of the present invention, a brake assembly comprises a brake disc in rotational engagement with a wheel of a vehicle. Therefore, the brake disc performs a rotational movement in accordance with the rotation of the wheel of the vehicle during driving the car. Further, a brake pad frictionally engages the brake disc when an actuator force is applied thereto, preferably in order to perform a dynamic braking operation or a service braking operation. The brake assembly also comprises an actuator having an output shaft driven in a forward direction to bring the brake pad and the brake disc into frictional engagement which defines the braking position of the brake assembly. The actuator may for example comprise an electromotor and a transmission member which are coupled to the output shaft such that a rotational movement of the electromotor, preferably of a rotor of the electromotor, is converted into an axial translational movement of the output shaft by means of the transmission member. The output shaft may also be driven in a reverse direction, opposite to the forward direction, to disengage the brake pad and brake disc and to move the brake pad into a rest position. The rest position may be defined as the position in which no actuator force respectively braking force is applied and/or as the position to which the brake pad moves after a braking operation, preferably a dynamic braking operation. The moving direction of the brake pad is not necessarily coaxially arranged with regard to a moving direction of the output shaft, however, a forward movement of the output shaft leads to a forward movement of the brake pad preferably into the frictional engagement with the brake disc, and a reverse movement of the output shaft leads to a reverse movement of the brake disc preferably to disengage the frictional contact with the brake disc.

According to the invention, the brake assembly comprises an energy absorption and/or storage unit adapted to absorb, preferably absorbing, forces acting on the output shaft in the reverse direction in case of a predetermined operation situation. Preferably, the energy absorption and/or storage unit is adapted to store energy, preferably the absorbed energy, for reuse. The energy absorption and/or storage unit may also be referred to as a protection unit, because damage to the brake assembly respectively the brake assembly components is prevented. In particular, the high dynamic actuation movements generated by the actuator and especially by electro-mechanical actuators are linked with very significant inertia forces acting on the output shaft for example in case of a malfunction of the brake assembly, such as a stress peak, false actuation, or a power loss of the brake assembly. The arrangement of the energy absorption and/or storage unit according to the invention prevents the brake assembly components from damage. This is achieved by absorbing the forces of the actuator shaft directed in the reverse direction in case of the predetermined operation situation, particularly by absorbing the kinematic energy linked with the translational movement of the output shaft when moving in the reverse direction.

A predetermined operation situation may occur in an uncontrolled situation of the brake assembly, for example upon unexpected energy supply shut-off or any internal malfunction of the brake actuator. During braking the force transmitting components of the brake assembly are preloaded according to the brake force level. In a controlled situation, the actuator moves the force transmitting components back to the initial unloaded position, preferably the rest position, and smoothly brakes down the movement of the force transmitting components. If an error, such as a malfunction or a power loss, occurs during the brake down movement without using a protection unit the brake actuator components would be further accelerated by the prestressed brake assembly component, preferably a caliper unit, and stopped by a shock-like collision or impact at the movement end position, thereby resulting in damage of the brake assembly components, preferably of the actuator.

In an example embodiment of the present invention, the energy absorption and/or storage unit is adapted to dissipate the absorbed forces, preferably the absorbed energy linked with the forces acting on the output shaft in case of the predetermined operation situation. For example, the absorbed forces respectively absorbed energy, may be dissipated by means of friction, electronic resistance or viscous dampening. Due to the arrangement and functioning of the energy absorption unit, in particular, due to the dissipation of the forces acting on the output shaft in the reverse direction in case of the predetermined operation situation, excessive forces respectively excessive energy is removed from the brake assembly system in order to prevent damage. Friction may be referred to as the force resisting the relative motion of solid surfaces, fluid layers, and material elements sliding against each other, for example the Coulomb model friction or the viscous friction, such as fluid or lubricated friction.

In an example embodiment of the present invention, the energy absorption and/or storage unit is adapted to accumulate the absorbed forces. Preferably, the energy absorption and/or storage unit comprises a spring member, an accumulator or a battery. The accumulated forces, particularly the accumulated absorbed energy, maybe fed into an energy recuperation system of the vehicle, preferably an energy recuperation system of the brake assembly. In this case, the absorbed accumulated energy may subsequently be used as an energy input for the actuator in a subsequent braking operation.

In a further example embodiment of the present invention, the energy absorption and/or storage unit is adapted to counteract the forces acting on the output shaft in the reverse direction in the predetermined operation situation. In a further development, the counteracting forces act such that the kinetic energy of the output shaft caused by the forces acting on the output shaft in the reverse direction is transferred into kinetic energy of the absorption unit, heat and/or electric energy. It is therefore possible, to accumulate at least part of the absorbed output shaft forces and dissipate at least part of the absorbed output shaft forces, depending on the available energy storing space or the energy needed for a subsequent brake operation.

In an example embodiment of the present invention, the energy absorption and/or storage unit is realized in that the actuator comprises an electric machine for driving the output shaft in the reverse direction and the forward direction. The electric machine may be operable in an electric generator mode which is adapted to absorb the output shaft forces in the predetermined operation situation. The electric generator mode maybe understood as an operation mode in which mechanical energy, preferably the kinematic energy for example of the output shaft or another driving output shaft of the actuator, is converted into electrical power respectively energy. Therefore, the excessive energy being present in the predetermined operation situation may be used to feed the electric generator mode and may be used to supply further electric components of the vehicle with the energy absorbed by the energy absorption unit.

In another example embodiment of the present invention, the brake assembly comprises the braking end position in which to brake pad and the brake disc are frictionally engaged. Further, a rest end position of the brake assembly is given in which the brake pad and brake disc are disengaged. A stop element may be arranged such that it limits the axial movement of the output shaft in the reverse direction beyond the rest position. This means that the stop element is positioned offset with respect to the rest position in the reverse direction. Further, the energy absorption and/or storage unit may be arranged such that an impact of the output shaft on the stop element is prevented, thereby preventing damage to the brake assembly.

In a further development of the present invention, the energy absorption and/or storage unit comprises a spring member or a viscous damper associated with the stop element such that upon movement of the output shaft from the rest position in the reverse direction a preferably oppositely oriented spring force and/or dampening force is applied on to the output shaft. The generated spring force and/or dampening force counteracts the critical forces acting on the output shaft in the reverse direction of the predetermined operation situation. Thus, the axial movement of the output shaft in the reverse direction is slowed down, preferably stopped.

According to an example embodiment of the present invention, the energy absorption and/or storage unit is an electric energy absorption and/or storage unit. Preferably, the energy absorption and/or storage unit is electrically activated, respectively deactivated, and or coupled to the actuator such that in case of the predetermined operation situation the energy absorption and/or storage unit is automatically activated in order to absorb the output shaft forces. According to a further development of the present invention, in case of the predetermined operation situation, the actuator engages a corresponding protection circuit, namely in terms of an electronic resistor for dissipating at least part of the absorbed energy and/or in terms of an electronic accumulator for storing at least part of the absorbed energy, even if the actuator is not supplied with energy.

In another example embodiment of the present invention, the energy absorption and/or storage unit comprises an eddy current brake, also known as an induction brake, electric brake or electric retarder, that slows down or stops the axial movement of the output shaft for example by dissipating the kinetic energy of the output shaft as heat. Upon movement of the output shaft in the reverse direction in the predetermined operation situation, preferably beyond the rest position, an electric current preferably through a coil of the energy absorption unit, preferably the eddy current brake, is induced, wherein particularly the induced electric current may be accumulated or dissipated by the energy absorption unit. According to the function principle of the eddy current brake electric current is induced because of an outer magnetic field acting on a moving component of the actuator or for example the output shaft, and the induced electric current induces a magnetic field which is oppositely oriented with regard to the outer magnetic field. Due to the fact of the oppositely oriented magnetic field with regard to the original magnetic field, the movement of the output shaft is slowed down, preferably stopped, whereby damage to the brake components resulting from high inertia and high dynamics of the brake actuator is prevented. It is possible that the electric resistor may be internally realized by the actuator itself, or externally realized by a separate electronic resistor component. In case of an internally realized energy absorption and/or storage unit, the electronic resistor may be realized by rotor windings of the electromotor of the actuator.

In an example embodiment of the invention, the actuator is coupled to the energy absorption and/or storage unit and configured in that the absorbed forces by the energy absorption and/or storage unit are dissipated by the actuator, wherein particularly the actuator comprises an electric resistor. For example, according to this embodiment, a brake resistor is provided which may be connected by default with a normally closed electric circuit and actively disconnected via a switch in normal operation mode, preferably if no predetermined operation situation occurs. Alternatively and or additionally, a capacitor may be connected to the circuit in order to store the absorbed energy preferably for reuse.

According to another example embodiment of the present invention, the actuator may be a pneumatic, electro-mechanic or hydraulic actuator. It is clear that the inventive concept according to the invention is therefore not limited to a specific type of actuator used in the corresponding brake assembly.

According to another aspect of the present invention, a method for controlling a brake assembly is provided. The brake assembly comprises a brake disc, a brake pad, an actuator with an output shaft driven in a forward direction to bring the brake pad and brake disc into frictional engagement. The position of the brake pad and brake disc in the frictional engagement is referred to as the braking position. The output shaft may be driven in a reverse direction to disengage the brake pad and brake disc and to move the brake pad into a rest position. The rest position is referred to as the position in which no actuator force respectively no braking force is applied and which may also be referred to as an idle position to which the brake pad returns after a braking operation, in particular during dynamic or service braking operations.

According to the invention, forces acting on the output shaft in the reverse direction are absorbed in case of a predetermined operation situation. In particular, the high dynamic actuation movements generated by the actuator and especially by electro-mechanical actuators are linked with very significant inertia forces acting on the output shaft for example in case of a malfunction of the brake assembly, such as a stress peak, false actuation, or a power loss of the brake assembly. The arrangement of the energy absorption and/or storage unit according to the invention prevents the brake assembly components from damage. This is achieved by absorbing the forces of the actuator shaft directed in the reverse direction in case of the predetermined operation situation, particularly by absorbing the kinematic energy linked with the translational movement of the output shaft when moving in the reverse direction.

A predetermined operation situation may occur in an uncontrolled situation of the brake assembly, for example upon unexpected energy supply shut-off or any internal malfunction of the brake actuator. During braking the force transmitting components of the brake assembly are pre-loaded according to the brake force level. In a controlled situation, the actuator moves the force transmitting components back to the initial unloaded position, preferably the rest position, and smoothly brakes down the movement of the force transmitting components. If an error, such as a malfunction or a power loss, occurs during the brake down movement without using a protection unit the brake actuator components would be further accelerated by the prestressed brake assembly component, preferably a caliper unit, and stopped by a shock-like collision or impact at the movement end position, thereby resulting in damage of the brake assembly components, preferably of the actuator.

Preferred embodiments of the present invention are subject to the dependent claims.

It is noted that the method according to the invention can be defined such that it realizes the controller and/or the display device according to the described aspects of the invention, and vice versa.

The following detailed description refers to the accompanying drawings. The same reference numbers may be used in different drawings to identify the same or similar elements. In the following description, for purposes of explanation and not limitation, specific details are set forth such as particular structures, functionality, etc. in order to provide a thorough understanding of the various aspects of the claimed invention.

However, it will be apparent to those skilled in the art having the benefit of the present disclosure that the various aspects of the invention claimed may be practiced in other examples that depart from these specific details. In certain instances, descriptions of well-known devices and methods are omitted so as not to obscure the description of the present invention with unnecessary detail.

DETAILED DESCRIPTION OF THE DRAWINGS

Figure 1:
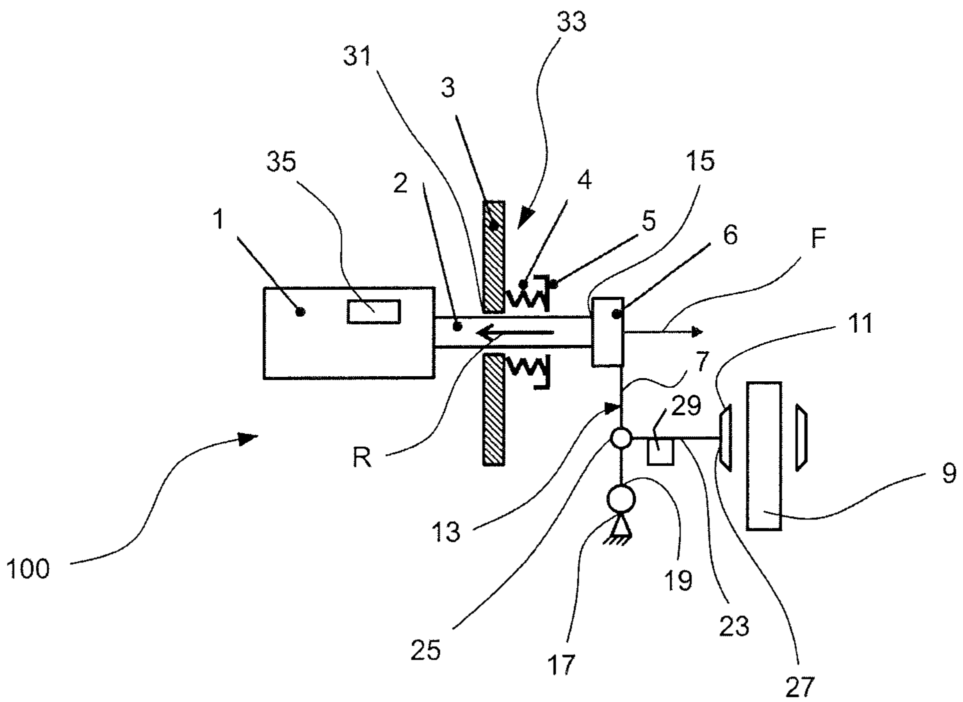
FIG. 1 is a schematic view of a brake assembly according to an embodiment of the invention.

In FIG. 1, an active braking operation of the brake assembly 100 is shown. During the braking operation, a brake pad 11 is in frictional engagement with a brake disc 9, which is in rotational engagement with a wheel of a vehicle (not shown). In the braking operation, a clamping force is applied by the brake pad 11 onto the brake disc 9. Actuation of the brake pad 11 is realized by means of an arrangement of levers 13. The arrangement of levers 13 is coupled to an output shaft 2 which may be actuated by an actuator 1. The arrangement of levers 13 may be form-fittingly and/or force-fittingly coupled to the output shaft by means of a coupling member 6 arranged at a distal end 15 of the output shaft 2. The arrangement of levers 13 comprises a pivoting member 7 which is mounted pivotingly on a mounting 17, which is normally fixedly arranged to a chassis of the vehicle (not shown), with one end 19 of the lever 7. At another end 21 of the lever 7 diametrically arranged with respect to the end 19 the lever 7 is coupled to the output shaft 2, preferably by means of the coupling member 6, such that lever 7 may perform a pivoting movement with respect to the mounting 17 and such that the output shaft 2 may perform a translational movement in a forward direction F and a reverse direction R. For the purposes of the current invention, the forward direction F defines the moving direction of the brake pad 9 into the braking operation position, respectively into frictional engagement with the brake disc 9. Further, the reverse direction R defines the opposite direction, namely the moving direction of the brake pad 11 when disengaging the brake disc 9 and moving into a rest position in which no braking force is applied.

Generally, during operation of the brake assembly 100 the actuator 1, which may, for example, be an electro-mechanic actuator, generates actuator forces, which cause the output shaft 2 to be driven in the forward direction F and the reverse direction R in order to bring the brake pad 11 and brake disc 9 into frictional engagement defining the braking position, respectively, in order to disengage the brake pad 11 and brake disc 9 to release the frictional engagement. One axial end position of the output shaft 2 is defined by the frictional engagement of the brake pad 11 and brake disc 9, respectively, the braking position as shown in FIG. 1. The output shaft 2 is driven in the forward direction F to cause a pivoting movement of the lever 7 with regard to the mounting 17, such that a shifting lever 23 connected to the pivoting lever 7 at one end 25 and connected to the brake pad 11 at another end 27 transfers the axial movement of the output shaft 2 in the forward direction F into an axial movement of the brake pad 9 in the forward direction F into the frictional engagement with the brake disc 9. From FIG. 1 it is clear that the pivoting lever 7 is caused to pivot with regard to the mounting 17, thereby causing the axial movement of the lever 23 and, therefore of the brake pad 11.

The brake assembly 100 may further comprise a slack adjuster 29, which is preferably a mechanical slack adjuster, which is adapted to adjust a predetermined axial slack distance between the brake pad 11 and the brake disc 9 in the rest position of brake pad 11. The slack adjuster 29 may be any adjusting device suitable for adjusting the axial slack distance between the brake pad 11 and the brake disc 9. For the purposes of illustration, the slack adjuster 29 is arranged at the shifting lever 23. However, it shall be clear that the slack adjuster 29 may be associated with other components of the brake assembly 100. The functioning and in particular the initiation of the slack adjustment procedure is explained in more detail with regard to FIGS. 2 and 3.

In FIG. 1, the other axial end position of the brake pad 11 respectively the output shaft 2 is indicated by a stationary end stop 3, preferably being fixedly attached to the chassis of the vehicle (not shown). The end stop 3 may be a thin-walled plate or disc preferably out of metal. The end stop 3 is arranged with regard to the output shaft 2 such that the output shaft performs a translational relative movement with regard to the end stop 3 in the forward direction F and the reverse direction R upon actuation by the actuator 1 and such that an axial movement of the output shaft in the reverse direction R is limited by the end stop 3. For example, the end stop 3 may comprise a through-hole 1 which is arranged concentrically with regard to the forward and reverse movement direction of the output shaft 2.

As illustrated, an energy absorption and/or storage unit 33 is provided in order to absorb forces acting on the output shaft 2 in the reverse direction R in case of a predetermined operation situation. The energy absorption and/or storage unit 33 is arranged such that during normal operation of the brake assembly 100, respectively during dynamic braking operations, the brake pad 11 respectively the output shaft 2 does not reach the end stop 3. The energy absorption and/or storage unit 33 applies a force onto the output shaft 2 directed in the forward direction F in case the output shaft 2 is moved beyond the rest position into the reverse direction R.

In order to adjust an axial slack distance between the brake pad 11 and the brake disc 9 a slack adjuster 29 may be arranged for example at the arrangement of levers 13. The energy absorption and/or storage unit 33 is realized by a spring unit 4. The spring unit 4 is supported with one end at the end stop 3, which is stationary, and with the other end at an actuation plate 5 which may be moved in accordance with a deformation of the spring unit 4. The rest position may also be referred to as the passive position in which no actuator braking force is applied, respectively in which no frictional engagement between the brake pad 11 and the brake disc 9 occurs and which defines the starting position of the brake pad 11 when the actuator 1 applies an actuation force to the output shaft 2 in order to perform a braking operation. Also, if a slack adjustment is necessary due to, for example, an undesired actual slack value and/or an undesired wear-and-tear level of the brake pad 11 and/or brake disc 9, the brake pad 11 is firstly brought into the rest position. The brake assembly 100 may, for example, comprise a sensor unit (not shown) for measuring the actual slack value and/or the actual wear-and-tear level of the brake pad 11 and/or brake disc 9. Further, the brake assembly 100, respectively the actuator 1, comprises a control unit 35 for electronically triggering a slack adjustment procedure. The control unit 35 may be connected to the sensor unit such that in case the sensor unit detects an undesired wear-and-tear level and/or an undesired slack value, the control unit 35 of the actuator 1 initiates an adjustment procedure. Therefore, the slack adjustment procedure is only initiated when necessary. Unnecessary adjustments are prevented.

Figure 2:
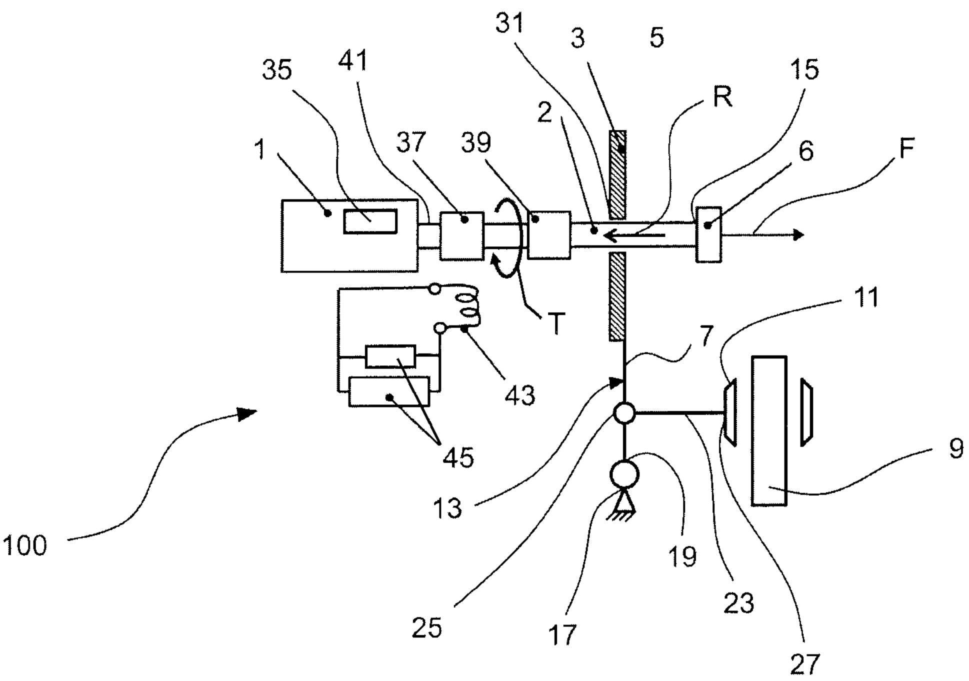
FIG. 2 is a schematic view of a further embodiment of the brake assembly according to the invention.

In FIG. 2, an alternative example embodiment of the brake assembly 100 is shown. For the purposes of simplification, in the following description it is only referred to the differences with regard to the example embodiment previously described with regard to FIG. 1. The same components are given the same reference numerals.

As can be seen, the spring member energy absorption and/or storage unit 33 (4, 5) from FIG. 1 is replaced by another example embodiment of the energy absorption and/or storage unit 33 which, according to FIG. 2, is realized as an electric energy absorption and/or storage unit, which is explained in more detail below.

The actuator 1 for driving the output shaft 2 in the forward direction F and the reverse direction R is enhanced with an electrodynamic actuating unit 37, comprising and/or realizing the electric energy absorption and/or storage unit 33, and by a transmission unit 39 adapted to transmit the rotational movement of the actuator 1 and the electrodynamic actuator 8 into the translation movement of the output shaft 2 in order to bring the brake pad 11 and brake disc 9 in the frictional engagement and in order to disengage the brake pad 11 and brake disc 9 from the frictional engagement. The transmission unit 39 may be any suitable mechanical component being able to transform a rotational actuating movement into a translational actuating movement. The actuator 1 rotationally drives an output shaft 41, the rotational direction being indicated by the arrow T. As can be seen, the rotating output shaft 41 is force-transmittingly coupled to the electrodynamic actuator 37 and to the transmission unit 39, which, as already explained, transmits the rotational movement of the output shaft 41 in rotational direction T into an axial movement of the output shaft 2 in forward direction F respectively reverse direction R.

In case of a predetermined operation situation, such as a malfunction or a power loss of the brake assembly, in particularly due to the high actuating dynamics and the inertia of the moving components of the brake assembly 100, forces acting on the output shaft 2 may cause damage to the brake assembly components 100. For example, the coupling member 6 may be stopped by the end stop 3 by a shock-like collision in which the end stop 3 and the coupling member 6 must withstand high forces which could lead to damage, or the rotating drive shaft 41 may be damaged due to increased angular velocities caused by the predetermined operation situation.

Similar to the spring member energy absorption and/or storage unit 33 according to FIG. 1, the electric energy absorption and/or storage unit 33 shown in FIG. 2 prevents the brake assembly 100 from damage. In the embodiment according to FIG. 2, the electrodynamic actuator 37 comprises a coil 43 electrically connected to an energy store 45, such as a capacitor or an accumulator. Instead of the energy store 45, an electric resistor may be provided for dissipating the absorbed energy by the energy absorption and/or storage unit 33. It is also possible that a parallel connection between an energy store and an electric resistor may be provided such that at least part of the absorbed energy may be dissipated by the resistor and at least part of the absorbed energy may be stored in the energy store 45. This energy distribution may be controlled by further control electronics (not shown). During the high dynamic operations, the electro-dynamic actuator 37 induces an electric current in the coil 43. Further, an outer magnetic field (not shown) is provided in the area of the rotating output shaft 41. The induced electric current in the coil 43 creates a magnetic field that opposes the change in the outer magnetic field or the direction of movement of the output shaft 41, which created the induced electric current. Thus, the induced electric currents react back on the source of the magnetic field such that a magnetic drag force is created on the turning magnetic output shaft 41 that opposes the turning movement of the output shaft 41, thereby providing the energy absorbing function by slowing down the rotational speed of the output shaft 41 and respectively the translational moving speed of the output shaft 2. Further, the electric energy absorption and/or storage unit 33 is arranged such that, for example, the coupling member 6 is prevented from strongly abutting against the end stop 3 in order to reduce the risk of damage to the brake assembly components.

The features disclosed in the above description, the Figures and the claims may be significant for the realization of the invention in its different embodiments individually as in any combination.

REFERENCE SIGN LIST

1 actuator
2 output shaft
3 end stop
4 spring member
5 actuating plate
6 coupling member
7 lever
9 brake disc
11 brake pad
13 lever arrangement
15 end
17 mounting
19, 21 end
23 lever
25, 27 end
29 slack adjuster
31 through-hole
33 energy absorption and/or storage unit
35 control unit
37 electrodynamic actuator
39 transmission unit
41 output shaft
43 coil
45 energy store or dissipator
100 brake assembly
F forward direction
R reverse direction
T rotational direction

The invention claimed is:

1. A brake assembly, comprising:
a brake disc in rotational engagement with a wheel of a vehicle;
a brake pad which frictionally engages said brake disc when an actuator force is applied thereto;
an actuator having an output shaft driven in a forward direction and a reverse direction, wherein movement of the output shaft in the forward direction brings the brake pad and brake disc into said frictional engagement, and wherein movement of the output shaft in the reverse direction brings the brake pad and brake disc out of said frictional engagement;
an energy absorption unit absorbing forces acting on the output shaft in the reverse direction in case of a predetermined operation situation occurring in an uncontrolled situation of the brake assembly, thereby transferring kinetic energy of the output shaft moving in the reverse direction into energy of the energy absorption unit; and
wherein the energy absorption unit is adapted to dissipate the absorbed forces, and
wherein the energy absorption unit applies a force onto the output shaft directed in the forward direction in case the output shaft is moved beyond a rest position in the reverse direction.

2. The brake assembly according to claim 1, wherein
the energy absorption unit is adapted to dissipate the absorbed forces by way of friction, electronic resistance or viscous dampening.

3. The brake assembly according to claim 1, wherein
the energy absorption unit is adapted to accumulate the absorbed forces by way of a spring member, an accumulator or a battery.

4. The brake assembly according to claim 1, wherein
the energy absorption unit is adapted to counteract forces acting on the output shaft in the reverse direction in the predetermined operation situation such that kinetic energy of the output shaft caused by the forces acting on the output shaft in the reverse direction is transferred into kinetic energy of the energy absorption unit, heat and/or electric energy.

5. The brake assembly according to claim 1, wherein
the energy absorption unit is realized in that the actuator comprises an electric machine for driving the output shaft, and
the electric machine is operable in an electric generator mode adapted to absorb said forces.

6. The brake assembly according to claim 1, wherein
the brake assembly comprises a braking end position in which the brake pad and brake disc are frictionally engaged, and a rest end position in which the brake pad and brake disc are disengaged,
a stop element is arranged so as to limit axial movement of the output shaft in the reverse direction beyond the rest position, and
the energy absorption unit is arranged such that an impact of the output shaft on the stop element is prevented.

7. The brake assembly according to claim 6, wherein
the energy absorption unit comprises a spring member or a viscous damper associated with the stop element such that upon movement of the output shaft from the rest position in the reverse direction, an oppositely oriented spring force and/or dampening force is applied on the output shaft.

8. The brake assembly according to claim 1, wherein
the energy absorption unit is electrically activated and/or coupled to the actuator such that in case of the predetermined operation situation, the energy absorption unit is automatically activated in order to absorb the output shaft forces.

9. The brake assembly according to claim 1, wherein
the energy absorption unit comprises an eddy current brake, wherein upon movement of the output shaft in the reverse direction, beyond the rest position, an electric current through a coil is induced, which is accumulated or dissipated by the energy absorption unit.

10. The brake assembly according to claim 1, wherein
the actuator is coupled to the energy absorption unit and configured in that the absorbed forces by the energy absorption unit are dissipated by the actuator, wherein the actuator includes an electric resistor.

11. The brake assembly according to claim 1, wherein
the actuator is a pneumatic, an electro-mechanic or a hydraulic actuator.

12. A method for controlling a brake assembly comprising a brake disc, a brake pad and an actuator with an output shaft driven in a forward direction and a reverse direction, the method comprising:
determining a predefined operating situation; and
absorbing and dissipating forces acting on the output shaft in the reverse direction in case of the predefined operating situation occurring in an uncontrolled situation of the brake assembly, thereby transferring kinetic energy of the output shaft in the reverse direction into one or more of kinetic energy of an energy absorption unit;
wherein the energy absorption unit applies a force onto the output shaft directed in the forward direction in case the output shaft is moved beyond a rest position in the reverse direction.

* * * * *